J. J. BURNEY.
DETACHABLE WHEEL RIM.
APPLICATION FILED DEC. 19, 1911.

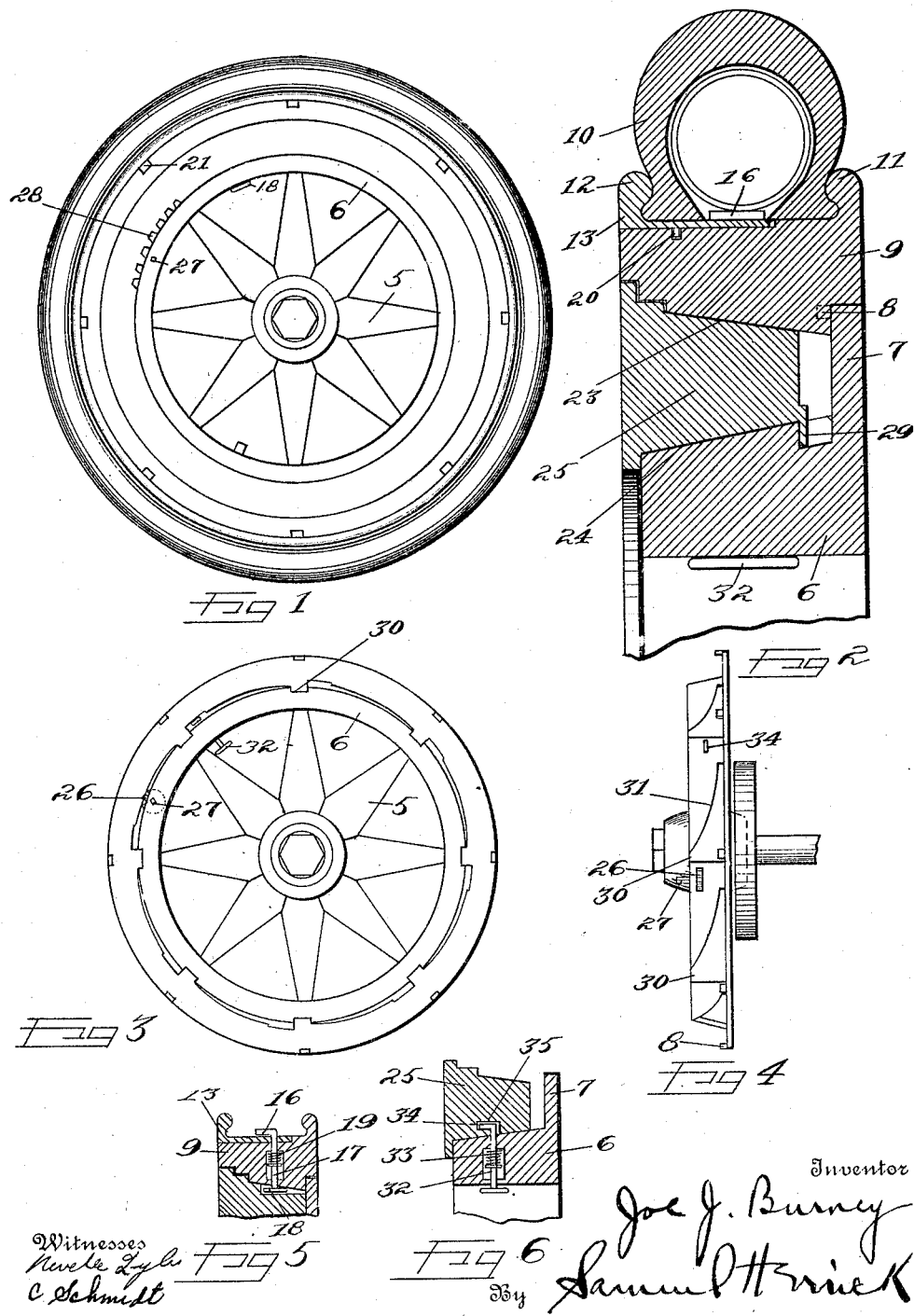

1,030,716.

Patented June 25, 1912.
2 SHEETS—SHEET 2.

UNITED STATES PATENT OFFICE.

JOE J. BURNEY, OF SHREVEPORT, LOUISIANA.

DETACHABLE WHEEL-RIM.

1,030,716.  Specification of Letters Patent.  Patented June 25, 1912.

Application filed December 19, 1911. Serial No. 666,698.

*To all whom it may concern:*

Be it known that I, JOE J. BURNEY, a citizen of the United States, residing at Shreveport, in the parish of Caddo and State of Louisiana, have invented certain new and useful Improvements in Detachable Wheel-Rims, of which the following is a specification.

This invention relates to vehicle wheels, and more particularly to wheels having detachable rims and adapted primarily for use in conjunction with motor vehicles.

The object of the present invention is to provide an improved device of the character set forth in which the several parts are firmly locked together, and in which the rim portion has an efficient driving connection with the spoke carrying portion to adapt the structure for efficient use upon a rear or driving wheel of a motor vehicle.

Further objects and advantages of the invention will be set forth in the detailed description which now follows.

Figure 7:
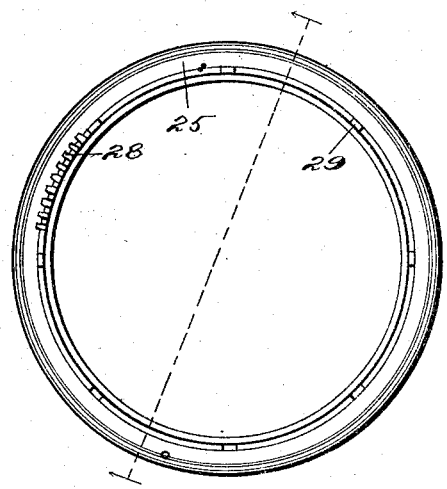
Figure 8:
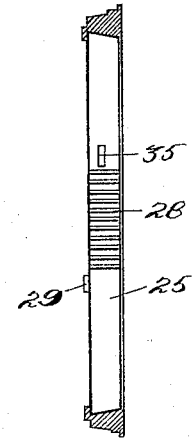
Figure 9:
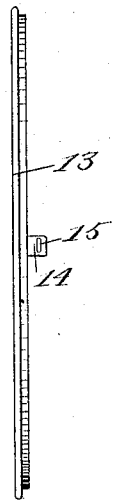
Figure 10:
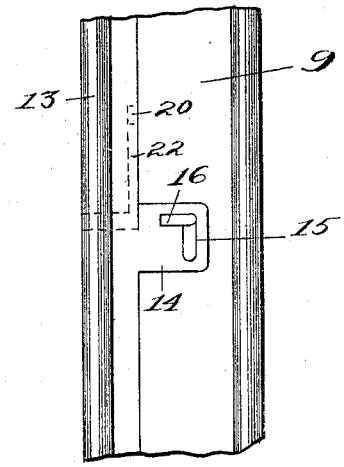

In the accompanying drawing Figure 1 is a side elevation of a wheel constructed in accordance with the invention. Fig. 2 is an enlarged sectional view therethrough. Fig. 3 is a front elevation of the inner or spoke carrying portion of the wheel. Fig. 4 is an edge elevation of said spoke carrying portion. Figs. 5 and 6 are detailed sectional views illustrating locking members hereinafter described. Fig. 7 is a face view of a locking ring. Fig. 8 is a sectional view through said locking ring. Fig. 9 is an edge view of a tire retaining flange, and Fig. 10 is an edge view showing said flange mounted upon the rim, the parts in this figure being shown upon a larger scale.

Like numerals designate corresponding parts in all of the figures of the drawing.

Referring to the drawing numeral 5 designates the spokes of the wheels upon which is mounted a fixed rim member 6. The rim member 6 is provided with a flange 7 at its rear face, said flange carrying stop members 8 which enter recesses formed in the rear face of a demountable rim 9 to thereby provide a driving connection between the fixed rim and the demountable rim. A pneumatic or other tire indicated at 10, and the construction of which is too well known to require further description, is held in place between a fixed flange 11 of the demountable rim 9 and a flange 12 of a ring like member 13. This ring like member (see Figs. 2, 10 and 11) is provided with an inwardly projecting lug 14, having a slot 15 formed therein. This slot 15 is adapted to receive the bent over end 16 of a latch 17 (see Fig. 5). It is apparent that if the latch is turned by manipulating its head 18 before the parts are assembled, to bring the end 16 into longitudinal alinement with the slot 15, a spring 19 will depress the latch until its end 16 is free of lug 14, at which time, and not until then, a partial rotation may be imparted to ring 13 with relation to the demountable rim 9. Ring 13 is provided with lugs 20, one of which is shown in Fig. 2. These lugs are adapted to travel transversely in slots 21 (see Fig. 1) in placing the ring 13 in position. After the ring has moved inwardly to the proper point, it may be given a partial rotation with relation to the demountable rim 9, the lugs 20 at this time traveling in longitudinal slots 22 which are continuations of slots 21 (see Fig. 10). It will, therefore, be understood that through the medium of ring 13 the tire is first secured upon the demountable rim, and that means, hereinafter described, are then employed for securing the demountable rim upon the rim 6.

The inner peripheral face of the demountable rim 9 is beveled at 23, and the outer peripheral face of the fixed rim is oppositely beveled at 24 and between these beveled surfaces a locking ring 25 is placed, having its inner and outer peripheral faces oppositely beveled to correspond with the beveled faces 23 and 24. The fixed rim 6 carries a pinion 26 to which rotation may be imparted by the application of a key (not shown) to the angular shaft 27 of said pinion. This pinion meshes with an internal rack 28 formed upon the inner peripheral face of ring 25 (see Figs. 3, 7 and 8). The ring 25 carries inwardly directed lugs 29 adapted to pass inwardly through openings 30 and to then engage behind and be forced inwardly by cam faces 31 when said ring is partially rotated with relation to the fixed rim 6. This partial rotation may be imparted to the locking ring through the medium of pinion 26, as will be readily understood. A locking device for locking the ring 25 against rotation with relation to the fixed rim 6 is illustrated in Fig. 6. This locking device comprises a latch 32, normally downwardly pressed by a spring 33 and having an "L" shaped end 34 adapted to engage in a recess 35 of ring 25. It is apparent from an inspection of Fig. 6 that when the latch is turned to bring the end 34 into transverse alinement with the rim 6, the latch will be held in an elevated and locking position, as shown, but when the end 34 is turned into longitudinal alinement with the wheel, the latch descends until it lies entirely within the rim 6 and permits rotation of ring 25. By virtue of the double wedging faces 23 and 24 and the corresponding wedge faces upon ring 25, it is apparent that when rotation is imparted to the ring and the ring is drawn inwardly by the engagement of its lugs 29 with the cam faces 31, a tight engagement between all of the parts is had, and since the stop members 8 are at this time engaged with the demountable rim 9, it is apparent that this in conjunction with the remainder of the structure provides an efficient driving connection between the fixed rim and the demountable rim.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described my invention what I claim is:—

In a demountable wheel rim, the combination with a fixed annular rim member having an inner edge outstanding flange and having its outer peripheral face inclined away from said flange and toward the axis of the wheel, said beveled face being cut away to form a plurality of cam faces, an annular demountable rim having its inner peripheral face oppositely inclined from that of the fixed rim member and having a portion extending inwardly of and bearing laterally against the outstanding flange of the said fixed member, members forming a driving connection between said flange and said inwardly extending portion, shoulders formed at the outer portion of the inner peripheral face of the demountable rim and a locking ring of wedge shape in cross section, bearing between the fixed and demountable rims, said locking ring having upon its outer periphery shoulders coacting with the shoulders of the demountable rim and having upon its inner periphery an inwardly extending annular flange which overlaps the outer face of the fixed rim member, and means carried by said locking ring for engaging said cams.

In testimony whereof I affix my signature in presence of two witnesses.

JOE J. BURNEY.

Witnesses:
F. L. WISDOM,
H. H. WHELESS.